United States Patent [19]
Trepka

[11] 3,817,957

[45] June 18, 1974

[54] PROMOTERS IN THE TREATMENT OF POLYMERIZATION MIXTURES WITH HALOGENATED POLYMERIZABLE COMPOUNDS

[75] Inventor: William J. Trepka, Bartlesville, Okla.

[73] Assignee: Phillips Petroleum Company, Bartlesville, Okla.

[22] Filed: Mar. 24, 1972

[21] Appl. No.: 237,873

[52] U.S. Cl.............. 260/83.7, 260/84.7, 260/85.1, 260/94.2 M, 260/94.6, 260/94.7 HA
[51] Int. Cl....... C08d 1/32, C08f 1/88, C08f 19/08
[58] Field of Search....... 260/94.7 HA, 880 B, 85.1, 260/84.7, 94.2 M, 83.7

[56] References Cited
UNITED STATES PATENTS

| | | | |
|---|---|---|---|
| 3,210,333 | 10/1965 | Strobel............................. | 260/85.1 |
| 3,435,011 | 3/1969 | Uraneck...................... | 260/94.7 HA |
| 3,468,972 | 9/1969 | Hsieh............................ | 260/94.7 A |
| 3,607,846 | 9/1971 | Halash et al...................... | 260/85.1 |

*Primary Examiner*—James A. Seidleck

[57] ABSTRACT

Coupling or branching in organoalkali metal-initiated polymerization reaction systems with halogenated polymerizable compounds, such as the halostyrenes, is significantly improved by the addition of polar compounds to the system after polymerization is essentially complete and prior to termination.

13 Claims, No Drawings

PROMOTERS IN THE TREATMENT OF POLYMERIZATION MIXTURES WITH HALOGENATED POLYMERIZABLE COMPOUNDS

FIELD OF THE INVENTION

The invention pertains to polymers of conjugated dienes. In another aspect, the invention appertains to modification of organolithium polymerization systems.

BACKGROUND OF THE INVENTION

Polymers of conjugated dienes having reduced tendency to cold flow can be produced in organoalkali metal-initiated polymerization systems by adding to the polymerization reaction mixture a small amount of a halogenated polymerizable compound, such as a nuclear halogen-substituted monovinyl-substituted aromatic compound. It is often preferred or necessary to add the vinyl-substituted halogenated aromatic compound at the end of the polymerization. However, at this stage the effectiveness of the halogenated polymerizable compound as a terminating agent has been relatively low, and the reaction rates have been slow. Improved effectiveness and accelerated reaction rates are very much to be desired.

SUMMARY OF THE INVENTION

I have discovered that the effectiveness of halogenated polymerizable compounds, such as the monovinyl-substituted halogenated aromatic compounds, can be significantly improved as coupling or branching or terminating agents in organoalkali metal initiated polymerization systems by the addition of a polar compound to the system after polymerization is substantially complete. The polar compound can be added prior to or with or just after the addition of the halogenated polymerizable compound coupling or branching agent.

Polar compounds have been employed priorly in the polymerization reaction itself as randomizing agents for copolymerization processes of such as butadiene and styrene. However, polar compounds when employed during the active polymerization stage tend to adversely affect the microstructure of the resulting polymer, i.e., increasing the vinyl unsaturation content. Some polar randomizers, such as potassium alkoxides, have been preferred in the past in that they have tended to increase the vinyl unsaturation to a somewhat lesser extent. However, even such "low vinyl" randomizers are rendered ineffective as randomizing agents if a halogenated polymerizable compound is present during the copolymerization reaction. Hence, under such conditions, the halogenated polymerizable compound must be added after polymerization is substantially complete. Yet, at that point, effectiveness as coupling agent has been relatively low.

To my knowledge, there has been no prior discovery that adding a polar compound after polymerization is substantially complete and at generally the same time as the addition of a halogenated polymerizable compound as coupling agent would so dramatically increase the efficiency of the latter as a coupling or branching agent.

More specifically, the addition of a polar compound after polymerization is substantially complete significantly improves the effectiveness of and accelerates the activity of halogenated polymerizable compounds as coupling or branching agents, without increasing the vinyl unsaturation content of the polymer, which structure, since polymerization at that point already is substantially complete, already is formed, and thus cannot at that stage be adversely affected by the polar compound.

DETAILED DESCRIPTION OF THE INVENTION

According to my invention, polymerization systems employing conjugated diene monomers, one or more, alone or with monovinyl-substituted aromatic compounds as comonomers, are initiated with organoalkali metal initiators; polymerization is carried substantially to completion; a polar compound then is added, and substantially coincidentally therewith is added the halogenated polymerizable compound as terminating agent. The so-prepared, modified, coupled or branched polymer subsequently can be treated for termination of all initiator activity and recovery of the polymer. By substantially coincidentally in the context of my invention, I mean just prior to, at the same time, with or separately, or just after.

TERMINATING AGENTS

The monovinyl-substituted halogenated aromatic compounds include the nuclear halogen-containing styrenes wherein at least one halogen substituent is in the two or four position, nuclear halogen-containing 1-vinylnaphthalenes in which at least one halogen substituent is present in a two or four position, and nuclear halogen-containing 2-vinylnaphthalene compounds wherein at least one halogen substituent is in a one or three position. These terminating agents can be represented by the following general formulae:

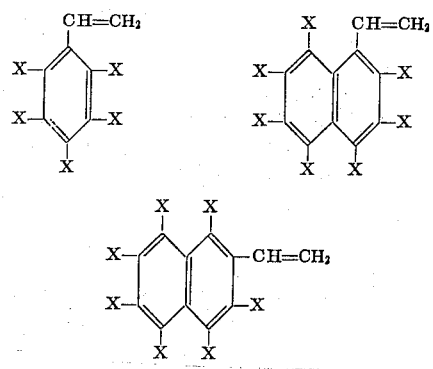

wherein each X is hydrogen, chlorine, bromine, iodine, fluorine, an alkyl group containing 1 to 6 carbon atoms, or a cycloalkyl group containing up to 6 carbon atoms, such that the total number of carbon atoms in all of the X groups together does not exceed about 6. The individual X groups can be the same or different. When the compound is a halogenated styrene or a halogenated 1-vinylnaphthalene, at least one of the X groups in the 2 or 4 position must be a halogen atom. When the compound is a halogenated 2-vinylnaphthalene, at least one of the X groups in the 1 or 3 position must be a halogen atom. The use of very small amounts of the halogen-containing compounds as terminating agents has a pronounced effect on the cold flow of the polymer but does not produce gel in any significant amount.

Examples of the halogen-containing styrenes and halogen-containing vinyl naphthalenes include 2-chlorostyrene, 4-chlorostyrene, 4-fluorostyrene, 2,6-diiodo-4-tert-butylstyrene, 4-chloro-1-vinylnaphthalene, 2,3,4-trichloro-1-vinylnaphthalene, 2,4,5-trichloro-3,6,7,8-tetramethyl-1-vinylnaphthalene, 3-bromo-2-vinylnaphthalene, 1,3-dichloro-4-methyl-2-vinylnaphthalene, and the like. A presently particularly useful material is a commercially available mixture containing about 65 weight percent 2-chlorostyrene, 30 percent 4-chlorostyrene, and 5 percent inert aromatic hydrocarbons. In my examples this material is referred to as monochlorostyrene (MCS).

The amount of terminating agent employed depends in general on the degree of increase in polymer molecular weight or decrease in polymer cold flow and/or other improvements desired in polymer processing characteristics. Thus, the amount employed can depend on the degree of coupling or branching desired, and can be readily determined for particular polymerization by those skilled in the art. As a guide to applicable ranges of the terminating agent, a suggested range would be about 0.1 to 5 gram millimoles per 100 grams of monomers charged.

The terminating step can be conveniently carried out in the presence of the diluent employed in the polymerization step. Additional inert diluent can be added, if desired, to the polymerization reaction mixture prior to or concurrent with the addition of the terminating agent employed in this invention. Suitable diluents are those generally employed in polymerization systems, such as n-pentane, n-heptane, cyclohexane, and the like. Any convenient or suitable temperature or pressure or other conditions can be employed for the terminating step, including those employed for the polymerization itself. For example, the temperature employed in the terminating step can be such as about 0° up to 150° C. or more, presently preferably for operating convenience from about 50° to 100° C. Since this invention is concerned with improving the rate of the terminating step, for practical purposes the temperature employed should not be so low as to defeat the purpose of the invention. The time employed in this terminating step can be whatever time convenient, such as from a few minutes up to several hours or more.

POLAR PROMOTERS

The polar compounds as promoters useful in the context of my invention include ethers, tertiary amines, hexa-substituted phosphoric triamides, alkali metal salts of organic hydroxy compounds, and combination type promoters having two or more such characteristics. In general, any species from these groups would be effective within the context of my invention. Presently preferred are those compounds with a carbon atom range of about 1 to 40 carbon atoms per molecule as a general range of more conveniently available compounds.

Ethers include any of the acyclic ethers, cyclic ethers, mono-or polyethers, such as dimethyl ether, or any other equivalent dialkyl ether including mixed ethers such as ethyl methyl ether, di-n-octyl ether, alkylaryl ethers such as dibenzyl ether, aryl ethers such as diphenyl ether, as well as other ethers such as anisole, tetramethylene oxide or tetrahydrofuran, 1,2-dimethoxyethane, 1,3-dioxane, 2,4,6-trimethyl-1,3,5-trioxane, bis(3,5-diphenoxyphenyl)ether, bis(diphenylmethyl)ether, cyclododecyl isobutyl ether, decyl phenyl ether, methyl tetracosyl ether, bis(2-butoxyethyl)ether, and the like.

Tertiary amines promoters include trimethylamine, triethylamine, or any other trialkylamine within the broad range I have disclosed, including mixed tertiary amines such as N,N-dimethyl-ethylamine, alkylarylamines such as N,N-dimethylaniline, arylamines such as triphenylamine, cyclic tertiary amines such as pyridine, quinoline, N-ethylpiperidine, N-methylmorpholine, N,N-didecyl-dodecylamine, N-isobutyl-dicyclohexylamine, tridodecylamine, 3,3′,3′′,7,7′,7′′-hexamethyltrioctylamine, quinuclidine, and the like.

Hexa-substituted phosphoric triamides promoters include those which can be represented by the general formula:

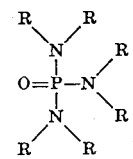

in which each R is individually selected from alkyl or aryl radicals containing from 1 to 8 carbon atoms, such as hexamethylphosphoric triamide, hexaphenylphosphoric triamide, hexaethylphosphoric triamide, hexa-n-propylphosphoric triamide, hexabutylphosphoric triamide, mixed phosphoric triamides such as N, N′, N′′-trimethyl-N,N′,N′′-triphenyl-phosphoric triamide, N,N-dimethyl-N′, N′, N′′,N′′-tetraphenyl-phosphoric triamide, and the like. Presently preferred of this group is hexamethylphosphoric triamide.

Alkali metal salts of organic hydroxy compounds, such as the alkali metal alkoxides and phenoxides in general, are suitable for my invention. The alkali metal salts include those in which the alkali metal is sodium, lithium, potassium, rubidium, or cesium. These alkali metal salts can be those of any of the aliphatic or cycloaliphatic alcohols or polyols or the aromatic hydroxy compounds, such as potassium methoxide, potassium t-butoxide, potassium t-pentyloxide (often called potassium t-amyloxide), potassium phenethyloxide, potassium ethylene glycolate, or any of the named alkali metals as salts of phenols such as sodium phenoxide, sodium-2-naphthoxide, and the like. Presently preferred are the potassium salts, more particularly such as potassium tert-butoxide or potassium tert-amyloxide.

Compounds of mixed types also can be used as promoters, such as 6-methoxy quinoline, and the like. Certainly, particular species of promoters can contain two or more active polar groups such as two tertiary amine groupings or more, or any other combination of two or more polar groupings such as the ether-amine I have illustrated.

AMOUNT OF PROMOTER

The amount of promoter employed depends in general on the degree of effect desired in conjunction with the halogenated polymerizable compound terminating agent in particular polymerization systems. Thus, the amount of promoter or mixture of promoters can range widely, so long as the amount employed is sufficient to provide the degree of improvement desired.

For the ether, tertiary amine, and hexaalkylphosphoric triamide promoters, the amount employed presently is preferred for overall effect to be within the range of about 0.01 to 1, more preferably from 0.05 to 0.5, parts by weight of the promoter per 100 parts by weight of monomers in the polymerization recipe.

However, in the case of the alkali metal salts of the aliphatic or cycloaliphatic alcohols or aromatic hydroxy compounds, it is presently preferred that the amount employed not exceed about a 1:1 mole ratio of promoter:halogenated polymerizable compound terminating agent. Since, the amount of halogenated polymerizable terminating agent employed will depend in general on the desired degree of increase in molecular weight of the polymer, the amount of alkali metal salt of aliphatic or cycloaliphatic alcohol or of aromatic hydroxy compound employed in effect is dependent to some extent on the amount of halogenated terminating agent employed.

POLYMERIZATION SYSTEMS

Monomers which can be employed in a polymerization process incorporating my invention are those polymerizable with organoalkali-metal initiator systems. Such monomers include the particularly useful conjugated dienes of from 4 to 12 carbon atoms per molecule, presently preferred being those of from 4 to 8 carbon atoms per molecule for commercial availability, as well as the monovinyl-substituted aromatic compounds of from 8 to 20 carbon atoms per molecule, presently preferred being those of from 8 to 12 carbon atoms per molecule since such are more readily commercially available. In general, I term the polymer products of my invention polymers of conjugated dienes, which term is intended to include homopolymers of any one conjugated diene, copolymers of any two or more conjugated dienes, and as well copolymers of one or more conjugated dienes with one or more monovinyl-substituted aromatic compounds. Presently preferred polymers include polybutadiene, polyisoprene, and essentially random copolymers of butadiene/styrene.

Examples of suitable monomers include the presently preferred 1,3-butadiene, isoprene, and styrene; as well as 2,3-dimethyl-1,3-butadiene, piperylene, 3-butyl-1,3-octadiene, 2phenyl-1,3-butadiene, 1-vinylnaphthalene, 3-methylstyrene, 4-cyclohexylstyrene, 4-dodecylstyrene, 2-ethyl-4-benzylstyrene, 4-tert-butylstyrene, 4-isopropylstyrene, and the like. Mixtures of two or more monomers can be employed. Furthermore, the monomers can be added together, or in sequential addition of different monomers.

ORGANOALKALI-METAL INITIATORS

The process of my invention can be applied to any of the organoalkali-metal polymerization initiator systems effective for polymerization of polymerizable monomers. Presently preferred for most purposes are the organolithium initiators, and my description of initiators thusly is couched with reference to the organolithium types. However, it is to be understood that any of the applicable organoalkali-metal initiators may be utilized, including those of sodium, potassium, rubidium, and cesium.

The term "organolithium initiators" is used herein in a broad sense to indicate any of the initiators which include one or more lithium atoms and one or more organic moieties, whether as organolithium compounds, lithium adducts, multilithium initiators, or other descriptive terms.

Among the various organolithium polymerization initiators are those which can be represented by the formula $R'Li_y$ in which $R'$ is a hydrocarbyl radical having a valence equal to of $y$, with $y$ being an integer of 1 to 4. The hydrocarbyl radical $R'$ is not limited as to number of carbon atoms by operability, but as to availability and convenience up to about 20 carbon atoms, although higher molecular weight compounds can be utilized. Exemplary initiators include methyllithium, n-butyllithium, sec-butyllithium, n-decyllithium, phenyllithium, 1-naphthyllithium, p-tolyllithium, cyclohexyllithium, and others wherein $R'$ is an aliphatic, cycloaliphatic, aromatic, or combination radical.

Adducts of lithium metal with a variety condensed ring aromatic hydrocarbons such as naphthalene, anthracene, and the like, can be employed. Such adducts can be solubilized if desired, by the use of a small amount of a polymerizable monomer such as butadiene in the preparation.

Various reaction products of organomonolithium compounds with compounds such as the polyvinyl-substituted aromatic compounds such as divinylbenzene, substituted vinyl products such as diisopropenylbenzene, and with various polyvinyl-substituted compounds of silicon or phosphorus such as tetravinylsilane or trivinylphosphine, can be utilized. These initiators can be solubilized if desired by the use of a small amount of a polymerizable monomer such as butadiene by contacting therewith the complex initiator so formed or prepared. Presently preferred of these are initiators formed from such as n-butyllithium and divinylbenzene.

The amount of polymerization initiator employed is that suitable to polymerize the monomer or monomers to be utilized under the conditions employed. A range of about 0.2 to 100, presently preferably from 0.5 to 15, milliequivalents of lithium in the initiator per hundred grams of monomer employed, typically can be employed.

POLYMERIZATION CONDITIONS

Polymerization conditions such as temperatures and times are those suitable for the monomers employed, the initiator used, the type of polymerization, and the like. Typical polymerization reaction conditions include operating conditions such as polymerization temperatures of about $-100$ to $+300°$ F., utilizing a polymerization time of a few minutes to upwards of 48 hours or more, as may be desired or convenient for commercial practice.

Pressures employed are those convenient and compatible with other reaction parameters. Pressures sufficient to maintain the polymerization mixture in the liquid phase are preferred from an operational standpoint. Diluents can be employed such as hydrocarbons having from 4 to 12 carbon atoms per molecule, such as n-butane, n-hexane, n-octane, n-dodecane, toluene, benzene, cyclohexane, and the like, including mixtures.

The polymerization reaction mixture treated according to my invention can be finally terminated or shortstopped with a material which inactivates or destroys any residual organolithium, such as alcohols, acids, water, and the like. The treated polymerization reaction mixture can be admixed with a stabilizer, e.g., antioxidant, or the like. The polymer can be finally recovered by conventional means such as steam stripping of the polymerization mixture, or coagulation of the polymer solution with a non-solvent such as isopropyl alcohol, or the like.

EXAMPLES

The following examples are intended to be illustrative of my invention. Particular species employed, particular reaction conditions, particular ratios, and the like, should be considered as illustrative and not as limitative of the reasonable scope of my invention.

A copolymerization process was employed for illustrative purposes, with a series of runs employing several different polar promoters. The general polymerization recipe employed in the several runs shown in the examples is shown below:

Recipe

| Polymerization Step | Parts by wt. or (mhm) |
|---|---|
| Butadiene | 75 |
| Styrene | 25 |
| Cyclohexane | 760 |
| n-Butyllithium, mhm | (variable) |
| Potassium tert-amyloxide (KTA), mhm | (variable) |
| Temperature, °F | 158 |
| Time, hr. | 0.5 |
| Charge Order: | Cyclohexane-nitrogen purge-butadiene-styrene-KTA-BuLi. | mhm = gram millimoles per 100 grams of monomers.

Monochlorostyrene (MCS) Reaction Step

| | |
|---|---|
| MCS | (variable) |
| Polar additive | (variable) |
| Temperature, °F | 158 |
| Time, minutes | (variable) |
| Charge Order: | monochlorostyrene (MCS), polar compound (if added), time, shortstop with antioxidant solution and recover polymer. |

Polymerizations were terminated with a 10 weight percent solution of a standard antioxidant, 2,6-di-tert-butyl-4-methylphenol, in a 50:50 by volume mixture of isopropyl alcohol:toluene, with the amount added being sufficient to provide about 1 part by weight of antioxidant per 100 parts by weight of monomers charged. The polymers were recovered by coagulation with isopropyl alcohol.

EXAMPLE I

The polar compound used in each of these runs was added immediately after addition of monochlorostyrene (MCS) as exemplary of the halogenated polymerizable additives. In each run the MCS was added at 30 minutes polymerization time, i.e., after essentially 100 percent conversion of monomers. Each run, except control runs, Run 1, employed 0.58 mhm of MCS reactant. All samples prepared were gel-free. All runs used 15:1 Li:K ratio and 0.7 mhm BuLi. Results are shown in Table I.

Run 1 employed no MCS and no promoter. Runs 2 and 3 employed MCS but no promoter. Addition of a small amount of polar compound promoter such as tetrahydrofuran, 1,2-dimethoxybenzene, or diethyl carbitol, resulted in equivalent or greater Mooney viscosity

TABLE I

| Run No. | Polar Compound Promoter | Parts (phm) | Reaction Time,(a) Minutes | Mooney ML-4 (b) | H.I.(c) | I.V.(d) | Cold Flow(e) |
|---|---|---|---|---|---|---|---|
| 1 | None | 0 | 60 | 21 | 1.16 | 1.35 | — |
| 2 | None | 0 | 15 | 49 | — (f) | 1.79 | 1.9 |
| 3 | None | 0 | 60 | 78 | 4.0 | 2.15 | — |
| 4 | Tetrahydrofuran | 0.05 | 15 | 73 | — | 2.04 | — |
| 5 | Tetrahydrofuran | 0.10 | 15 | 91 | — | 2.24 | — |
| 6 | Tetrahydrofuran | 0.50 | 15 | 98 | 2.1 | 2.34 | — |
| 7 | 1,2-Dimethoxybenzene | 0.05 | 15 | 85 | — | 2.20 | — |
| 8 | 1,2-dimethoxybenzene | 0.10 | 15 | 88 | 2.2 | 2.24 | — |
| 9 | 1,2-Dimethoxybenzene | 0.50 | 15 | 76 | — | 2.10 | — |
| 10 | Diethyl carbitol | 0.05 | 15 | 76 | — | 2.04 | — |
| 11 | Diethyl carbitol | 0.10 | 15 | 82 | — | 2.11 | — |
| 12 | Diethyl carbitol | 0.50 | 15 | 74 | 3.2 | 2.09 | — |
| 13 | KTA (g) | 0.01 | 15 | 51 | — | 1.79 | 1.7 |
| 14 | KTA | 0.03 | 15 | 62 | — | 1.95 | — |
| 15 | KTA | 0.05 | 15 | 71 | 2.3 | 2.09 | — |
| 16 | KTA | 0.1 | 15 | 72 | 2.4 | 2.09 | — |
| 17 | KTA | 0.5 | 15 | 38 | — | — | 3.16 |
| 18 | KTA | 1 | 15 | 32 | — | 1.56 | — | a. For Run 1 this is the polymerization time. For other runs this time is the time after MCS was added to the polymerization reaction mixture.
b. ASTM D 1646-63, ML-4 at 212° F.
c. Heterogeneity Index is defined as the ratio of the weight average molecular weight ($M_w$) to the number average molecular weight ($M_n$) as determined by gel permeation chromatography.
d. Inherent viscosity was determined according to the procedures of U.S. Pat. No. 3,278,508, col. 20, notes a and b.
e. Cold flow was measured by extruding the rubber through a ¼ inch orifice at 3.5 psi pressure at a temperature of 50° C. After allowing 10 minutes to reach a steady state, the rate of extrusion was measured and reported in milligrams per minute.
f. A "—" indicates falue not determined.
g. KTA = potassium tert-amyloxide.

increases in 15 minutes reaction time as could be obtained without a polar promoter with 60 minutes reaction time. In these runs, tetrahydrofuran appeared to be the most effective accelerator. KTA also effected accelerated Mooney viscosity increase, although at higher KTA levels the effect was somewhat reduced, possibly attributable to reaction of KTA with MCS, thus inactivating the halostyrene.

EXAMPLE II

Additional runs were made, using the polymerization recipe as shown above, and employing a polar promoter, tetrahydrofuran, in some runs, and in some runs omitting the tetrahydrofuran, while using a halostyrene in each run. For the preparation of oil extended polymers, polymers were dissolved in cyclohexane, blended with 37.5 phr of aromatic oil, phr being parts by weight per 100 parts by weight of rubber (polymer). The aromatic oil was Type 101 under ASTM D 2226-63T. The oil extended polymers were recovered by steam stripping. All runs used 15:1 Li:K, 0.85 mmole BuLi. Results are shown in Table II.

TABLE II

| Run No. | MCS, mhm | Mooney ML-4 | I.V. | Oil Extended ML-4 |
|---|---|---|---|---|
| No Polar Promoter, 1 Hr. Reaction | | | | |
| 19 | 0 | 24 | 1.42 | — |
| 20 | 0.43 | 64 | — | — |
| 21 | 0.58 | 87 | — | — |
| 22 | 0.72 | 96 | — | — |
| 23 | 0.87 | 113 | 2.58 | 44 |
| 24 | 1.01 | 138 | 2.76 | 53 |
| 0.5 Part THF Promoter, 0.5 Hour Reaction | | | | |
| 25 | 0.43 | 94 | — | — |
| 26 | 0.58 | 109 | 2.48 | 42 |
| 27 | 0.72 | 135 | 2.82 | 54 |
| 28 | 0.87 | 145 | 2.83 | — |
| 29 | 1.01 | 134 | 2.81 | 52 |

It is apparent from the above data that THF activation gave significantly greater Mooney viscosity increase. The increase not only was more effective, but obtained in half the time, which certainly is of considerable commercial advantage.

My invention improves the rate of the terminating step in which a halogenated polymerizable compound is employed as terminating agent to provide polymer products of reduced cold flow, improved processability, and increased molecular weight.

The polymers of this invention, which are normally solid rubbery polymers, can be compounded with fillers, stabilizers, curatives, vulcanization accelerators, plasticizers, pigments, and the like, employed in the rubber compounding arts. These polymers can be used in a variety of applications, such as in the manufacture of tires, tubing, belting, gaskets, hose, and the like.

Reasonable variations and modifications are possible in the scope of this invention without departing from the spirit and scope thereof.

I claim:

1. In a process for the polymerization of at least one polymerizable monomer, wherein said polymerizable monomer is at least one conjugated diene, or at least one conjugated diene with at least one monovinyl substituted aromatic compound, with an organoalkali metal initiator under polymerization conditions, wherein a polymerizable monovinyl-substituted halogenated aromatic compound terminating agent is added to the polymerization reaction mixture after polymerization is substantially complete and prior to quenching, the improvement comprising adding to the polymerization reaction mixture at least one polar promoter substantially coincidentally with the addition of said polymerizable monovinyl-substituted halogenated aromatic compound terminating agent, wherein said polar promoter is a hexaalkylphosphoric triamide or alkali metal salt of an aliphatic or aromatic hydroxy compound wherein said alkali metal is lithium, potassium, sodium, rubidium, or cesium, wherein said monovinyl-substituted halogenated aromatic compound terminating agent is a nuclear halogen-containing styrene wherein at least one halogen substituent is in the two or four position, nuclear halogen containing 1-vinylnaphthalene in which at least one halogen substituent is present in a two or four position, or nuclear halogen containing 2-vinylnaphthalene wherein at least one halogen substituent is in a one or three position, which can be represented by the following general formulae:

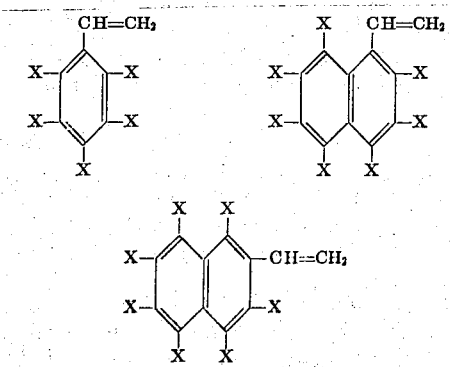

wherein each X is hydrogen, halogen, an alkyl group or cycloalkyl group containing up to 6 carbon atoms, such that the total number of carbon atoms in all of the X groups together does not exceed about 6 and individual X groups can be the same or different, such that at least one X is halogen, and said halogen is chlorine, bromine, iodine, or fluorine.

2. The process according to claim 1 wherein said polar promoter is added to said polymerization reaction mixture after substantially complete polymerization and prior to said terminating agent, after the addition thereof, or with the addition thereof.

3. A process according to claim 2 wherein said polymerizable conjugated diene contains 4 to 12 carbon atoms per molecule, said monovinyl substituted aromatic compound contains 8 to 20 carbon atoms per molecule, and said polar promoter contains up to 40 carbon atoms per molecule.

4. A process according to claim 3 wherein is employed from 0.01 to 1 parts of said polar compound by weight per 100 parts by weight of polymerizable monomer, and from 0.1 to 5 gram millimoles of said terminating agent per 100 grams of polymerizable monomer.

5. The process according to claim 4 wherein said organolithium initiator is employed in an amount sufficient to provide from about 0.2 to 100 milliequivalents of lithium in said initiator per 100 grams of said polymerizable monomer employed.

6. The process according to claim 4 wherein said polar compound is alkali metal alkoxide.

7. The process according to claim 6 wherein said monovinyl-substituted halogenated aromatic compound terminating agent is a halogenated styrene.

8. The process according to claim 7 wherein said polymerizable monomer is a conjugated diene and a monovinyl substituted aromatic compound, and the resulting polymer is a copolymer.

9. The process according to claim 8 wherein said polymerizable monomer is butadiene and styrene, the resulting polymer is butadiene/styrene copolymer, said polar promoter is potassium tert-amyloxide, and said coupling agent is chlorostyrene.

10. The process according to claim 1 wherein said polar promoter is added to said polymerization reaction mixture with the addition of said polymerizable monovinyl-substituted halogenated aromatic compound terminating agent.

11. The process according to claim 1 wherein said polar promoter is added to said polymerization reaction mixture after the addition of said polymerizable monovinyl-substituted halogenated aromatic compound terminating agent and within a time thereafter sufficient to substantially improve the coupling activity of said terminating agent.

12. The process according to claim 1 wherein said polar compound is said hexa-substituted phosphoric triamide.

13. The process according to claim 1 wherein said polar compound is said alkali metal salt of an aliphatic or aromatic hydroxy compound.

* * * * *